US012104496B2

(12) United States Patent
Kim

(10) Patent No.: US 12,104,496 B2
(45) Date of Patent: Oct. 1, 2024

(54) CMC GAS TURBINE ENGINE COMPONENT WITH SEPARATED FIBER PLIES

(71) Applicant: RAYTHEON TECHNOLOGIES CORPORATION, Farmington, CT (US)

(72) Inventor: Russell Kim, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 143 days.

(21) Appl. No.: 17/883,937

(22) Filed: Aug. 9, 2022

(65) Prior Publication Data

US 2023/0056767 A1 Feb. 23, 2023

Related U.S. Application Data

(60) Provisional application No. 63/234,886, filed on Aug. 19, 2021.

(51) Int. Cl.
*F01D 5/28* (2006.01)
*F01D 9/02* (2006.01)
*F01D 25/00* (2006.01)

(52) U.S. Cl.
CPC .......... *F01D 25/005* (2013.01); *F01D 5/282* (2013.01); *F01D 9/02* (2013.01); *F05D 2220/32* (2013.01); *F05D 2300/6033* (2013.01)

(58) Field of Classification Search
CPC ... F01D 5/14; F01D 5/28; F01D 5/282; F01D 5/284; F01D 9/02; F05D 2240/121; F05D 2240/303; F05D 2300/6033
See application file for complete search history.

(56) References Cited

U.S. PATENT DOCUMENTS

| 10,569,481 | B2* | 2/2020 | Gallier | ............... | B29D 99/0028 |
| 2005/0238491 | A1* | 10/2005 | Morrison | ................ | F01D 5/187 |
| | | | | | 416/229 R |
| 2008/0116614 | A1* | 5/2008 | Morrison | .............. | C04B 35/645 |
| | | | | | 264/332 |

(Continued)

FOREIGN PATENT DOCUMENTS

DE 102018213417 2/2020
EP 3415717 12/2018

(Continued)

OTHER PUBLICATIONS

European Search Report for European Patent Application No. 22188823.3 mailed Dec. 16, 2022.

*Primary Examiner* — Courtney D Heinle
*Assistant Examiner* — Sang K Kim
(74) *Attorney, Agent, or Firm* — Carlson, Gaskey & Olds, P.C.

(57) ABSTRACT

A gas turbine engine component includes a component wall that has an exterior core gaspath side and an opposed interior side. The component wall is formed of a ceramic matrix composite that includes a plurality of fiber plies disposed in a ceramic matrix. The component wall includes a corner that connects first and second wall sections. The fiber plies extend continuously through the first wall section, the corner, and the second wall section. The fiber plies are in a stacked contiguous arrangement in the first and second wall sections and at least some of the fiber plies separate from one another in the corner to define one or more void pockets there between.

16 Claims, 1 Drawing Sheet

(56) References Cited

U.S. PATENT DOCUMENTS

| | | | |
|---|---|---|---|
| 2010/0322760 A1 | 12/2010 | Morrison et al. | |
| 2013/0251939 A1* | 9/2013 | Kleinow | B32B 18/00 |
| | | | 156/89.11 |
| 2015/0231849 A1 | 8/2015 | Chapman et al. | |
| 2016/0003072 A1* | 1/2016 | Chang | F01D 9/041 |
| | | | 156/189 |
| 2023/0383657 A1* | 11/2023 | Kim | F01D 5/282 |

FOREIGN PATENT DOCUMENTS

| | | |
|---|---|---|
| EP | 3667029 | 6/2020 |
| WO | 2014133721 | 9/2014 |

\* cited by examiner

CMC GAS TURBINE ENGINE COMPONENT WITH SEPARATED FIBER PLIES

CROSS-REFERENCE TO RELATED APPLICATIONS

The present disclosure claims priority to U.S. Provisional Application No. 63/234,886 filed Aug. 19, 2021.

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A gas turbine engine component according to an example of the present disclosure includes a component wall that has an exterior core gaspath side and an opposed interior side. The component wall is formed of a ceramic matrix composite that includes a plurality of fiber plies disposed in a ceramic matrix. The component wall includes a corner that connects first and second wall sections. The fiber plies extend continuously through the first wall section, the corner, and the second wall section. The fiber plies are in a stacked contiguous arrangement in the first and second wall sections and at least some of the fiber plies separate from one another in the corner to define one or more void pockets there between.

In a further embodiment of any of the foregoing embodiments, the corner is acute.

In a further embodiment of any of the foregoing embodiments, there are at least two of the void pockets.

In a further embodiment of any of the foregoing embodiments, relative to the exterior core gas path side, a first one of the void pockets is inboard of a second one of the void pockets.

In a further embodiment of any of the foregoing embodiments, the fiber plies are arranged in groups, each of the groups having at least two of the fiber plies that are contiguous, and at least some of the groups separating from one another in the corner to define the one or more void pockets there between.

In a further embodiment of any of the foregoing embodiments, each of the groups has at least two of the fiber plies.

In a further embodiment of any of the foregoing embodiments, there are at least two of the void pockets, and the void pockets are of unequal thickness.

In a further embodiment of any of the foregoing embodiments, the corner is a leading edge of an airfoil.

In a further embodiment of any of the foregoing embodiments, the fiber plies are arranged in groups, each of the groups having at least two of the fiber plies that are contiguous, and at least some of the groups separating from one another in the corner to define the one or more void pockets there between.

A gas turbine engine according to an example of the present disclosure includes a compressor section, a combustor in fluid communication with the compressor section, and a turbine section in fluid communication with the combustor. The turbine section or the combustor has at least one component that has a component wall that has an exterior core gaspath side and an opposed interior side. The component wall is formed of a ceramic matrix composite that includes a plurality of fiber plies disposed in a ceramic matrix. The component wall includes a corner that connects first and second wall sections. The fiber plies extend continuously through the first wall section, the corner, and the second wall section. The fiber plies are in a stacked contiguous arrangement in the first and second wall sections and at least some of the fiber plies separate from one another in the corner to define one or more void pockets there between.

In a further embodiment of any of the foregoing embodiments, the corner is acute.

In a further embodiment of any of the foregoing embodiments, there are at least two of the void pockets.

In a further embodiment of any of the foregoing embodiments, relative to the exterior core gas path side, a first one of the void pockets is inboard of a second one of the void pockets.

In a further embodiment of any of the foregoing embodiments, the fiber plies are arranged in groups, each of the groups having at least two of the fiber plies that are contiguous, and at least some of the groups separating from one another in the corner to define the one or more void pockets there between.

In a further embodiment of any of the foregoing embodiments, each of the groups has two of the fiber plies.

In a further embodiment of any of the foregoing embodiments, there are at least two of the void pockets, and the void pockets are of unequal thickness.

In a further embodiment of any of the foregoing embodiments, the corner is a leading edge of an airfoil.

In a further embodiment of any of the foregoing embodiments, the fiber plies are arranged in groups, each of the groups having at least two of the fiber plies that are contiguous, and at least some of the groups separating from one another in the corner to define the one or more void pockets there between.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
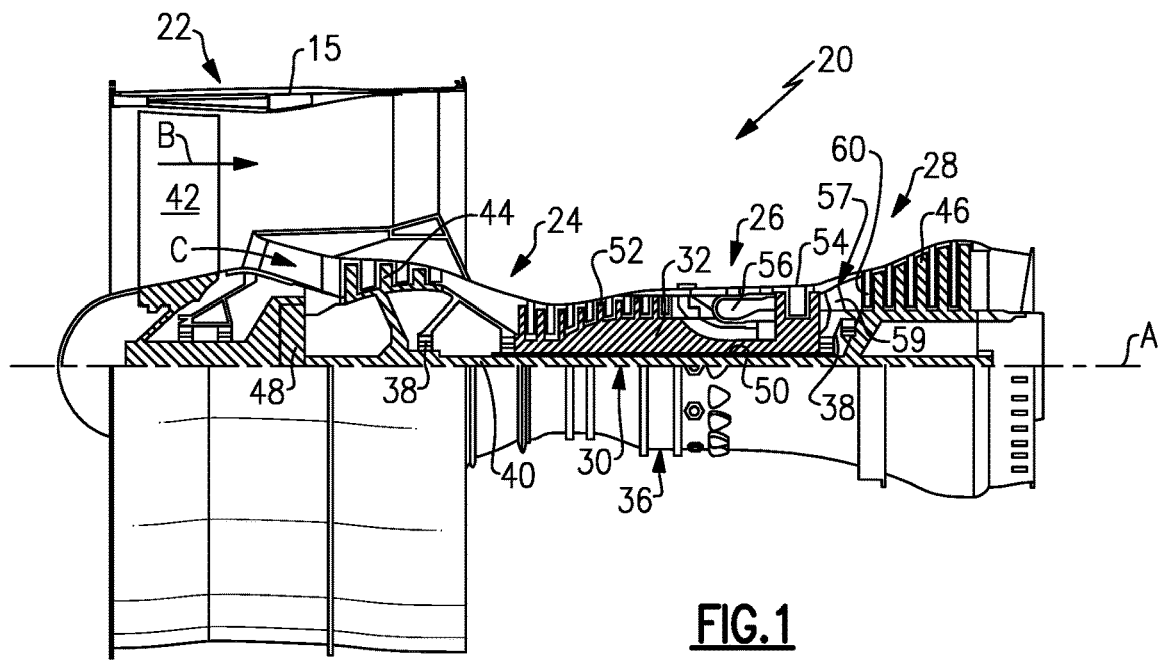
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram \, °R)/(518.7° \, R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
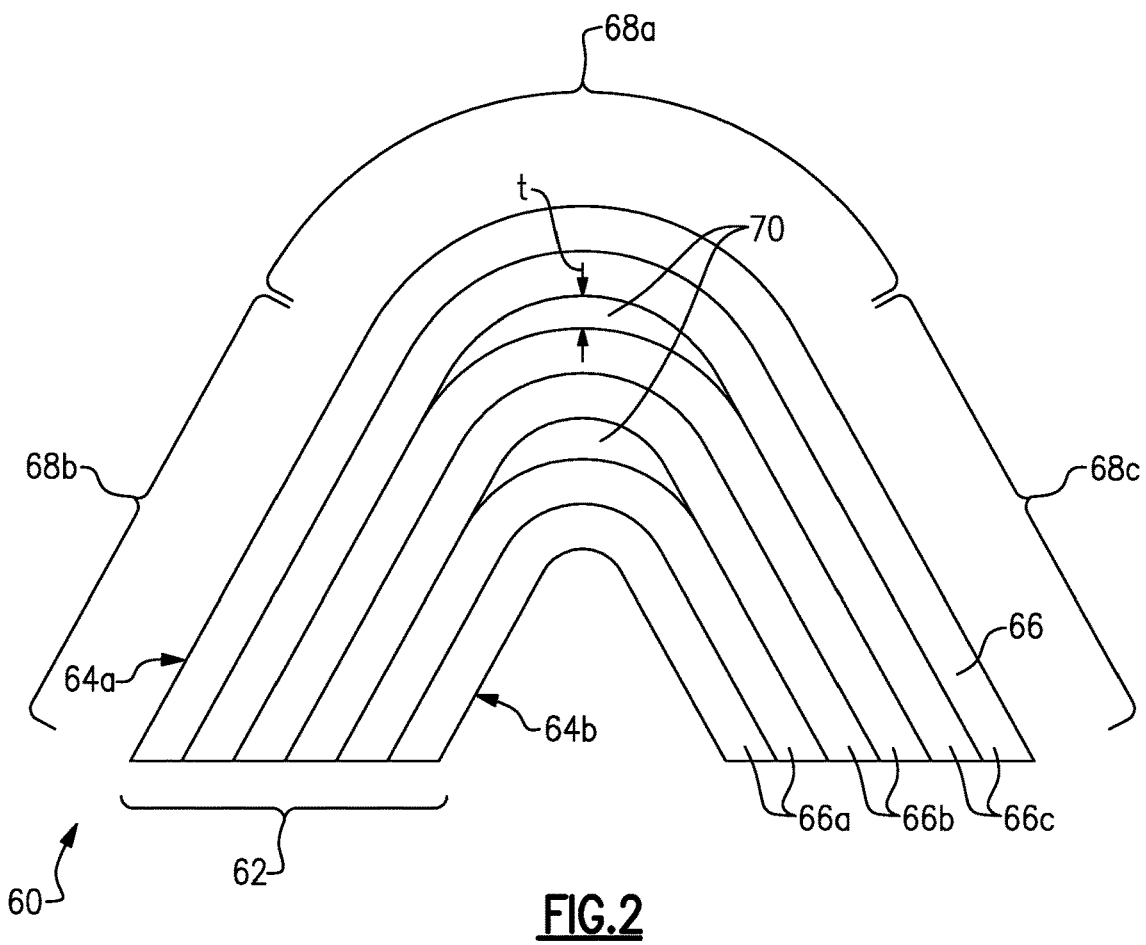
FIG. 2 illustrates a gas turbine engine component.

FIG. 2 illustrates selected portions of a sectioned view of a gas turbine engine component 60, namely component wall 62. In the illustrated example, the component 60 is an airfoil, such as a turbine vane or turbine blade, and a leading edge of the airfoil is shown. It is to be appreciated, however, that this disclosure is not limited to leading edges or airfoils and that the examples herein may also be applied to a trailing edge or to other engine components, such as but not limited to, outer air seals and combustor panels may also benefit from this disclosure.

In the illustrated example, the component wall 62 has an exterior core gaspath side 64a and an opposed interior side 64b. The gaspath side 64a is exposed to hot combustion gases in the core flow path C of the engine 20. The interior side 64b borders an internal passage in the component 60, such as a core cavity or cooling passage.

The component wall 62 is formed of a ceramic matrix composite (CMC) that includes a plurality of fiber plies 66 that are disposed in a ceramic matrix. For example, the CMC may be, but is not limited to, a SiC/SiC CMC in which SiC fiber plies are disposed within a SiC matrix. A fiber ply is a 2-dimensional sheet of woven fiber tows. For example, the fiber plies 66 may have a harness weave structure.

The component wall includes a corner section 68a that connects first and second wall sections 68b/68c. The fiber plies 66 extend continuously through the first wall section 68b, the corner 68a, and the second wall section 68c. The fiber plies 66 are in a stacked contiguous arrangement in the first and second wall sections 68b/68c. In the illustrated example, the corner section 68a is acute in that the angle formed between the interior side 64b of the wall sections 68b/68c is less than 90°. The term "stacked" refers to the plies 66 being arranged one on top of another. The term "contiguous" refers to the plies being in contact from one ply to the next. That is, the plies are stacked back-to-back.

At least some of the fiber plies 66 separate from one another in the corner 68a to define one or more void pockets 70 there between. In the illustrated example there are two void pockets 70, and one of the void pockets 70 is inboard of the other relative to the exterior gaspath side 64a. The void pockets 70 are thin, relative to the thickness of a single one of the fiber plies 66. For instance, the maximum thickness t of each void pocket 70 is less than the thickness of a single one of the plies 66. In general, the thickness t is equal to or less than 250 micrometers. The thickness t, however, may be varied to adapt the design for a particular airfoil geometry without compromising cavity radius or to increase cavity radius if desired. The bending of the fiber plies 66 bend in the corner 68a give the void pockets 70 an arced shape. For instance, each void pocket 70 is divergent-convergent in that between its endpoints it diverges from one endpoint to the maximum thickness and then converges from the maximum thickness to the other endpoint.

The void pockets 70 serve to facilitate reductions in thermal gradients and reductions in interlaminar stresses. For instance, the void pockets 70 serve as insulation regions and thereby reduce thermal transfer from the exterior gaspath side 64a to the interior side 64b. If additional cooling is desired, the void pockets 70 can be provided with cooling air flow, such as bleed air from the compressor section 24. The void pockets 70 also locally reduce geometric constraints on the fiber plies 66. For instance, under thermal stresses that are representative of the thermal conditions in the engine 20, the void pockets 70 permit unconstrained local thermal growth of the fiber plies 66 and thereby reduce interlaminar tension. Interlaminar shear may increase, however, shear may be more tolerable than tension. In contrast, in a similar configuration of the same corner radius and ply thickness that does not have the void pockets 70, the plies constrain one another and thus generate comparatively higher interlaminar stresses. The void pockets 70 may also facilitate damage tolerance. For instance, if the outer fiber plies 66 at the exterior gaspath side 64a were to become damaged, such as from a foreign object impact, the void pockets 70 may act as a buffer to isolate the damage to those plies. Moreover, if there is cracking from damage or normal use, such crack progression may occur in stages, where void pockets 70 provides points of arrest rather than progressing through an entire ply stack.

In the illustrated example, the number and arrangement of the fiber plies 66 is also configured to facilitate increased strength and durability. For example, the fiber plies 66 are arranged in groups, represented at 66a/66b/66c. Each of the groups 66a/66b/66c has two of the fiber plies 66 that are contiguous. The first group 66a separates from the second group 66b in the corner 68a and the second group 66b separates from the third group 66c in the corner 68a. As discussed above, the void pockets 70 between the groups 66a/66b/66c facilitate reductions in thermal gradients and reductions in interlaminar stresses. The use of two fiber plies 66 in each group 66a/66b/66c facilitates increasing stiffness and strength.

The void pockets 70 may also facilitate formation of acute corners. For example, during layup of the fiber plies 66 in fabrication of the component 60, the void pockets 70 provide the fiber plies 66 space to bend without constraint from adjacent fiber plies 66. In some examples, however, to keep the void pockets 70 from collapsing during fabrication and/or to control the geometry of the void pockets 70, consumable mandrels may be used. The fiber plies 66 are laid up around the consumable mandrels, and the mandrels are later dissolved or otherwise removed, leaving the void pockets 70 in their place.

An alternate method that does not use consumable materials may be used to form the void pockets 70. For example, an adhesive is used to temporarily attach plies together around a mandrel or other shaping tool to retain a desired shape prior to insertion into a graphite tool and subsequent densification in a furnace. The void pockets 70 are created in the preform stage by maintaining a separation in the desired area and selectively applying the adhesive to hold the plies in place. For instance, the adhesive is applied at least at the ends of the void pockets 70 to prevent the pockets from collapsing. The graphite tool and mandrels may have to be modified to create pinch points at the ends to constrain the pre-form to retain the void, since the pre-form tends to expand and may cause the voids to close during the densification process due to high temperatures. Given this description, one of ordinary skill in the art will be able to determine tolerancing of the tooling to achieve the desired void pocket 70 size. If there is some collapsing of the void pockets 70 during this processing, consumable material may be selectively used in those areas to limit collapse.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine component comprising:
   a component wall that has an exterior core gaspath side and an opposed interior side, the component wall being formed of a ceramic matrix composite that includes a plurality of fiber plies disposed in a ceramic matrix, the component wall including a corner connecting first and second wall sections, the corner is a leading edge of an airfoil, the fiber plies extending continuously through the first wall section, the corner, and the second wall section, the fiber plies being in a stacked contiguous arrangement in the first and second wall sections and at least some of the fiber plies separating from one another in the corner to define one or more void pockets there between.

2. The gas turbine engine component as recited in claim 1, wherein the corner is acute.

3. The gas turbine engine component as recited in claim 1, wherein there are at least two of the void pockets.

4. The gas turbine engine component as recited in claim 3, wherein, relative to the exterior core gas path side, a first one of the void pockets is inboard of a second one of the void pockets.

5. The gas turbine engine component as recited in claim 1, wherein the fiber plies are arranged in groups, each of the groups having at least two of the fiber plies that are contiguous, and at least some of the groups separating from one another in the corner to define the one or more void pockets there between.

6. The gas turbine engine component as recited in claim 5, wherein each of the groups has at least two of the fiber plies.

7. The gas turbine engine component as recited in claim 5, wherein there are at least two of the void pockets, and the void pockets are of unequal thickness.

8. The gas turbine engine component as recited in claim 1, wherein the fiber plies are arranged in groups, each of the groups having at least two of the fiber plies that are contiguous, and at least some of the groups separating from one another in the corner to define the one or more void pockets there between.

9. A gas turbine engine comprising:
a compressor section;
a combustor in fluid communication with the compressor section; and
a turbine section in fluid communication with the combustor, the turbine section or the combustor having at least one component including:
a component wall that has an exterior core gaspath side and an opposed interior side, the component wall being formed of a ceramic matrix composite that includes a plurality of fiber plies disposed in a ceramic matrix, the component wall including a corner connecting first and second wall sections, the corner is a leading edge of an airfoil, the fiber plies extending continuously through the first wall section, the corner, and the second wall section, the fiber plies being in a stacked contiguous arrangement in the first and second wall sections and at least some of the fiber plies separating from one another in the corner to define one or more void pockets there between.

10. The gas turbine engine as recited in claim 9, wherein the corner is acute.

11. The gas turbine engine as recited in claim 9, wherein there are at least two of the void pockets.

12. The gas turbine engine as recited in claim 11, wherein, relative to the exterior core gas path side, a first one of the void pockets is inboard of a second one of the void pockets.

13. The gas turbine engine as recited in claim 9, wherein the fiber plies are arranged in groups, each of the groups having at least two of the fiber plies that are contiguous, and at least some of the groups separating from one another in the corner to define the one or more void pockets there between.

14. The gas turbine engine as recited in claim 13, wherein each of the groups has two of the fiber plies.

15. The gas turbine engine as recited in claim 13, wherein there are at least two of the void pockets, and the void pockets are of unequal thickness.

16. The gas turbine engine as recited in claim 9, wherein the fiber plies are arranged in groups, each of the groups having at least two of the fiber plies that are contiguous, and at least some of the groups separating from one another in the corner to define the one or more void pockets there between.

* * * * *